US008050579B2

(12) United States Patent
Murakami

(10) Patent No.: US 8,050,579 B2
(45) Date of Patent: Nov. 1, 2011

(54) IMAGE FORMING APPARATUS CAPABLE OF CHANGING FIXING TEMPERATURE AND IMAGE FORMING METHOD THEREFOR

(75) Inventor: Reiji Murakami, Kanagawa (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 517 days.

(21) Appl. No.: 12/206,446

(22) Filed: Sep. 8, 2008

(65) Prior Publication Data

US 2009/0074436 A1 Mar. 19, 2009

Related U.S. Application Data

(60) Provisional application No. 60/972,240, filed on Sep. 13, 2007.

(51) Int. Cl.
*G03G 15/00* (2006.01)
*G06F 15/00* (2006.01)

(52) U.S. Cl. ........... 399/45; 399/15; 358/1.13; 358/1.15

(58) Field of Classification Search .................... 399/15, 399/45; 358/1.13, 1.15
See application file for complete search history.

(56) References Cited

U.S. PATENT DOCUMENTS

| | | | | |
|---|---|---|---|---|
| 6,381,422 | B1 * | 4/2002 | Tanaka | 399/45 |
| 7,653,320 | B2 * | 1/2010 | Ota et al. | 399/45 |
| 7,773,253 | B2 * | 8/2010 | Katayanagi | 358/1.9 |
| 2001/0009615 | A1 * | 7/2001 | Yokobori et al. | 399/45 |
| 2002/0135792 | A1 * | 9/2002 | Sommer et al. | 358/1.13 |
| 2003/0063916 | A1 * | 4/2003 | Katayanagi et al. | 399/44 |
| 2003/0099007 | A1 * | 5/2003 | Towner et al. | 358/520 |
| 2003/0215252 | A1 * | 11/2003 | Yokobori et al. | 399/45 |
| 2003/0219270 | A1 * | 11/2003 | Kondo | 399/69 |
| 2005/0031364 | A1 * | 2/2005 | Hayashi | 399/69 |
| 2005/0254845 | A1 * | 11/2005 | Taki et al. | 399/45 |
| 2007/0025745 | A1 * | 2/2007 | Aoki | 399/16 |
| 2007/0147865 | A1 * | 6/2007 | Hanada et al. | 399/67 |
| 2007/0263242 | A1 * | 11/2007 | Takahashi | 358/1.14 |
| 2008/0240750 | A1 * | 10/2008 | Hanamoto et al. | 399/45 |

FOREIGN PATENT DOCUMENTS

JP 2003-237982 8/2003

* cited by examiner

*Primary Examiner* — David Gray
*Assistant Examiner* — Francis Gray
(74) *Attorney, Agent, or Firm* — Patterson & Sheridan, LLP

(57) ABSTRACT

An image forming apparatus according to an embodiment of the present invention includes a paper-type detecting unit that detects a paper type of a sheet to be printed, a fixing unit that sets fixing temperature on the basis of the paper type detected by the paper-type detecting unit and fixes a toner image on the sheet, and a fixing-temperature changing unit that changes the fixing temperature of the fixing unit to high temperature when a printed image fixed by the fixing unit is an image that fades or is matte compared with fixing temperature for an image that is rough or is glossy.

8 Claims, 6 Drawing Sheets

IMAGE FORMING APPARATUS CAPABLE OF CHANGING FIXING TEMPERATURE AND IMAGE FORMING METHOD THEREFOR

CROSS-REFERENCE TO RELATED APPLICATION

This application is based upon and claims the benefit of priority from U.S. Provisional Application No. 60/972,240 filed on Sep. 13, 2007, the entire contents of which are incorporated herein by reference.

TECHNICAL FIELD

The present invention relates to an image forming apparatus, and, more particularly to an image forming apparatus capable of changing fixing temperature and a method for the image forming apparatus.

BACKGROUND

Conventionally, in image forming apparatuses such as a multifunction color copying apparatus (an MFP), types of media on which color image and the like are printed increase. Even when printing media are limited to paper, various types of paper having different thicknesses and the like are used.

Such types of paper are usually distinguished by basis weight (unit: $g/m^2$) indicating weight per a fixed area. For example, papers in groups of basis weights 64 to 105, 106 to 163, 164 to 209, 210 to 256, and 257 to 300 are called plain paper, thick paper 1, thick paper 2, thick paper 3, and thick paper 4. These basis weights are usually written on packages of sheets. A user selects one of the groups of the written basis weights, whereby a printing condition corresponding to a type of paper belonging to the selected group is automatically set. In general, it is desirable to change a printing condition according to basis weight. However, basis weight may be unknown. In such a case, it is difficult to easily detect basis weight. It is possible to calculate basis weight from the density and thickness of a sheet. Although it is difficult to measure the density of a sheet, the measurement of paper thickness is relatively easy compared with the measurement of density. Therefore, there are known devices that detect paper thickness in order to learn a paper type and the like.

One of these paper thickness detecting devices includes a pair of conveying rollers that convey a sheet. The paper thickness detecting device measures a displacement amount of the conveying rollers when the sheet is passed between the conveying rollers and detects paper thickness from this displacement amount. In other words, the conveying rollers are used also as paper thickness detecting rollers.

In another one of the paper thickness detecting devices, a roller exclusively used for paper thickness detection is provided separately from the conveying rollers, a counter plate is provided to be opposed to this roller. The paper thickness detecting device measures an amount of displacement of the paper thickness detecting roller by a sheet entering between the counter plate and the paper thickness detecting roller and detects paper thickness.

Still another one of the paper thickness detecting devices includes, for example, as disclosed in JP-A-2003-237982, a driving roller instead of the counter plate and rotates the driving roller in synchronization with the conveyance of a sheet.

Such paper thickness detecting devices in the past detect paper thickness in any case. A paper type is estimated from the paper thickness. Therefore, usually, this paper thickness detection is performed, density is assumed, a paper type is estimated, and a printing condition, for example, fixing temperature of a toner image developed with a toner is changed according to the thickness of a sheet detected by the paper thickness detection. Consequently, in most cases, satisfactory printing can be performed.

However, as described above, even if paper thickness is fixed, when the density of the sheet is outside an assumed range of values, it is likely that basis weight changes and an optimum printing condition changes. In such a case, a sufficiently satisfactory printed image may not be obtained.

SUMMARY

The present invention has been devised in view of the above points and it is an object of the present invention to provide an image forming apparatus capable of changing fixing temperature that can automatically distinguish a paper type and perform printing and can perform satisfactory printing and an image forming method for the image forming apparatus.

According to an aspect of the present invention, there is provided an image forming apparatus capable of changing fixing temperature including a paper-type detecting unit that detects a paper type of a sheet to be printed, a fixing unit that sets fixing temperature on the basis of the paper type detected by the paper-type detecting unit and fixes a toner image on the sheet, and a fixing-temperature changing unit that changes the fixing temperature of the fixing unit to high temperature when a printed image fixed by the fixing unit is an image that fades or is matte compared with fixing temperature for an image that is rough or is glossy.

According to another aspect of the present invention, there is provided an image forming method capable of changing fixing temperature, the image forming method including detecting the thickness of a sheet to be printed, fixing a toner image on the sheet at predetermined fixing temperature corresponding to a paper type based on the thickness detected in the detecting, changing the fixing temperature in the fixing to first fixing temperature when a printed image fixed in the fixing is an image that is rough or is glossy and changing the fixing temperature to a second fixing temperature higher than the first fixing temperature when the printed image fixed in the fixing is an image that fades or is matte, and fixing the toner image on a new sheet again after the fixing temperature is changed in the changing.

DETAILED DESCRIPTION

An embodiment of the present invention is explained in detail below with reference to the accompanying drawings. In the following explanation, it is assumed that an image forming apparatus according to the embodiment is a multifunction color copying apparatus.

Figure 1:
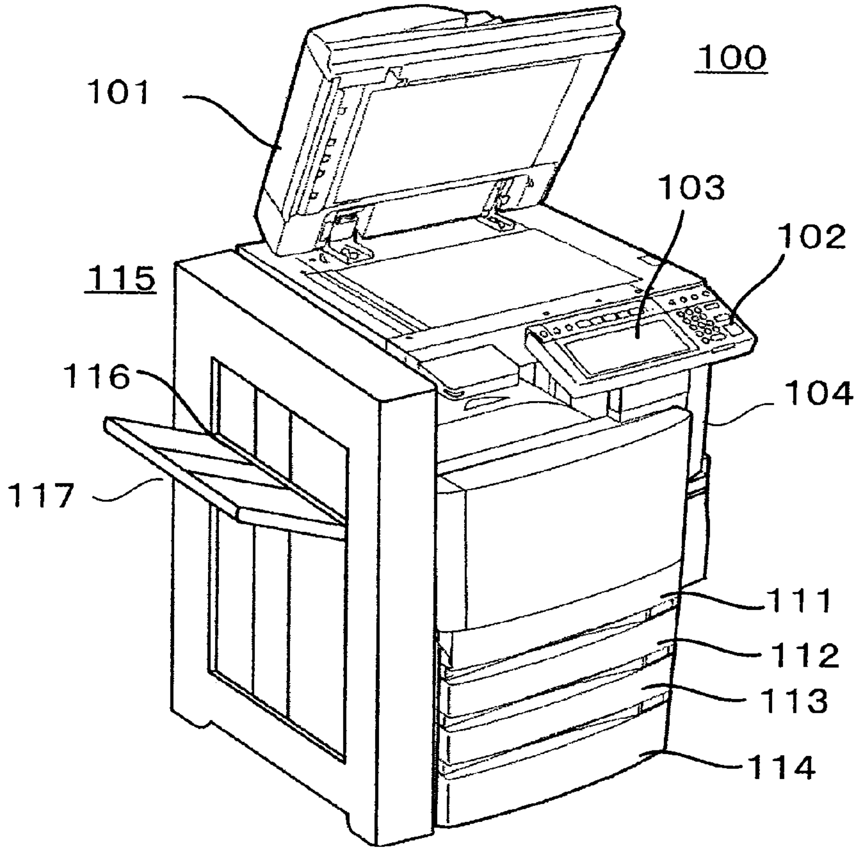
FIG. 1 is a perspective view showing an overview of a multifunction color copying apparatus (an MFP) according to an embodiment of the present invention.

FIG. 1 is a perspective view showing an example of an external appearance of the multifunction color copying machine according to this embodiment. An automatic document feeder (ADF) 101 that also serves as an original cover and automatically feeds sheet-like originals one by one is openably and closably provided in an upper part of an apparatus main body 100. An operation panel 102 including various operation keys for instructing a copy condition and the start of copying, various display devices, and the like is provided in a front section on an upper surface of the apparatus main body 100. Various setting and registration buttons (not shown) are also provided in the operation panel 102. A touch panel display 103 on which various kinds of information for the user are displayed and with which, when the user is requested to input information, the user can perform predetermined input by touching the same is provided beside the operation panel 102.

A handle 104 is provided below the operation panel 102 on a front surface of the apparatus main body 100 to allow the user to open the inside of the main body when, for example, a paper jam occurs.

Paper feeding cassettes 111, 112, 113, and 114 are detachably provided in a lower part of the apparatus main body 100. Sheets of different sizes and paper types are stored in the paper feeding cassettes, respectively.

A post-processing apparatus 115 is attached on the left side of the apparatus main body 100. In the apparatus main body 100, a latent image described later is formed, printed, and fixed on a sheet. The sheet is subjected to processing such as aligning and stapling in the post-processing apparatus 115 and discharged from a sheet discharge port 116. The sheet discharged from the sheet discharge port 116 is stacked on a stacking tray 117.

Figure 2:
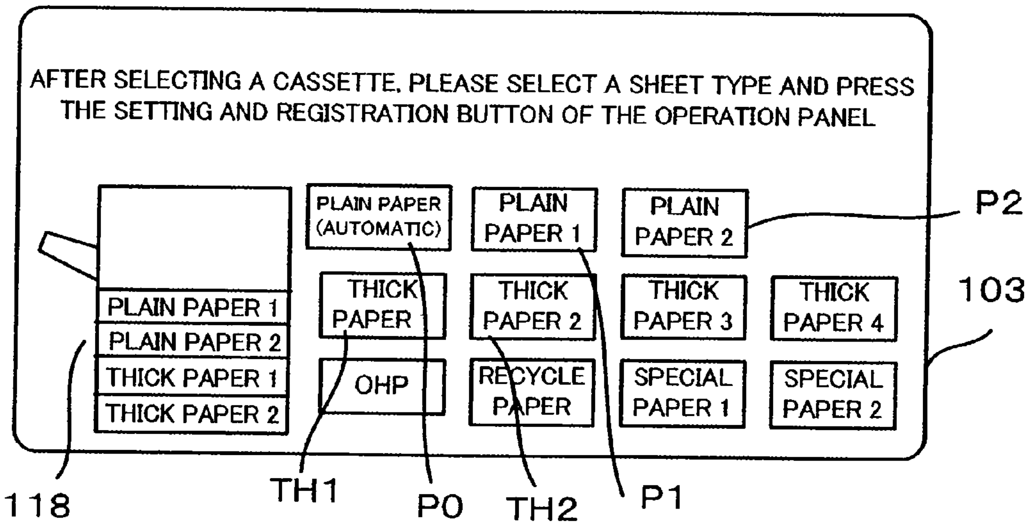
FIG. 2 is a diagram showing an example of a display screen on a touch panel display 103 of an operation panel 102 during input of basis weight.

When the user presses a setting and registration button of the operation panel 102, first, a general setting registration screen is displayed on the touch panel display 103. When the user clicks a sheet setting icon of this screen, a sheet setting screen shown in FIG. 2 is displayed. A main body side icon 118 is displayed on the left side of this screen. Buttons P0, P1, and P2 for plain paper (automatic), plain paper 1, and plain paper 2 are arrayed and displayed at a first stage on the right of the main body side icon 118. Buttons for four kinds of thick paper, i.e., thick paper 1, thick paper 2, thick paper 3, and thick paper 4 are displayed at a second stage. Buttons corresponding to types of sheets other than plain paper and the thick paper are displayed at a third stage.

Above these kinds of display, a guidance "after selecting a cassette, please select a paper type and press the setting and registration button of the operation panel" is displayed. According to this guidance, the user touches any one of paper feeding cassettes of the main body side icon 118, then, touches an icon of a paper type displayed on the right side, and selects a paper type stored in the selected paper feeding cassette. By repeating this operation, paper types are displayed in respective paper feeding cassette positions of the main body side icon 118. When the user presses the setting and registration button of the operation panel 102, a correspondence relation between the paper feeding cassettes and the paper types stored in the paper feeding cassettes is stored in a cassette-sheet-correspondence recognizing unit 122.

Figure 3:
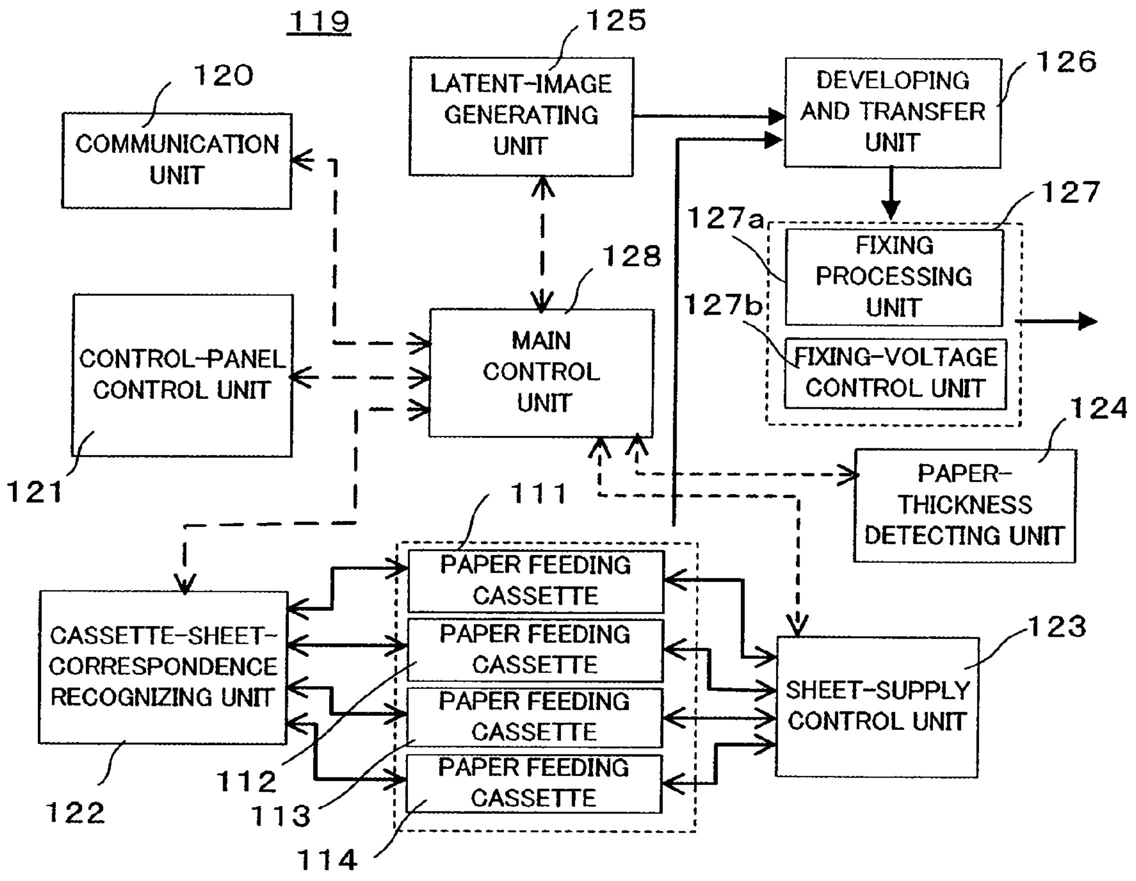
FIG. 3 is a diagram showing an electric schematic configuration of the entire MFP according to the embodiment.

An electric schematic configuration of the multifunction color copying apparatus according to this embodiment shown in FIG. 1 is shown in FIG. 3. This MFP 119 includes a communication unit 120 connected to the outside through a network, a control-panel control unit 121 that controls an entire control panel including the operation panel 102 and the touch panel display 103 shown in FIG. 1, a cassette-sheet-correspondence recognizing unit 122 that recognizes in advance paper types stored in the paper feeding cassettes 111, 112, 113, and 114, a sheet-supply control unit 123 that supplies, according to a type of a sheet inputted to the touch panel display 103 as explained with reference to FIG. 2, a sheet of the type, a paper-thickness detecting unit 124 that accurately detects the thickness of the sheet supplied by the sheet-supply control unit 123, a latent-image generating unit 125 that scans an original in performing copying or the like in the MFP 119 and generates, for example, an electrostatic latent image, a developing and transfer unit 126 that develops the latent image generated by the latent-image generating unit 125 using, for example, a toner and transfers a toner image formed by the development onto a predetermined sheet, a fixing unit 127 that fixes the transferred image with predetermined voltage, and a main control unit 128 that controls the respective units.

The fixing unit 127 includes a fixing processing unit 127*a* that applies image fixing processing to the predetermined sheet and a fixing-voltage control unit 127*b* that controls fixing voltage in performing the fixing processing. The fixing-voltage control unit 127*b* is a fixing-temperature changing unit that changes fixing temperature by controlling fixing voltage.

Figure 4:
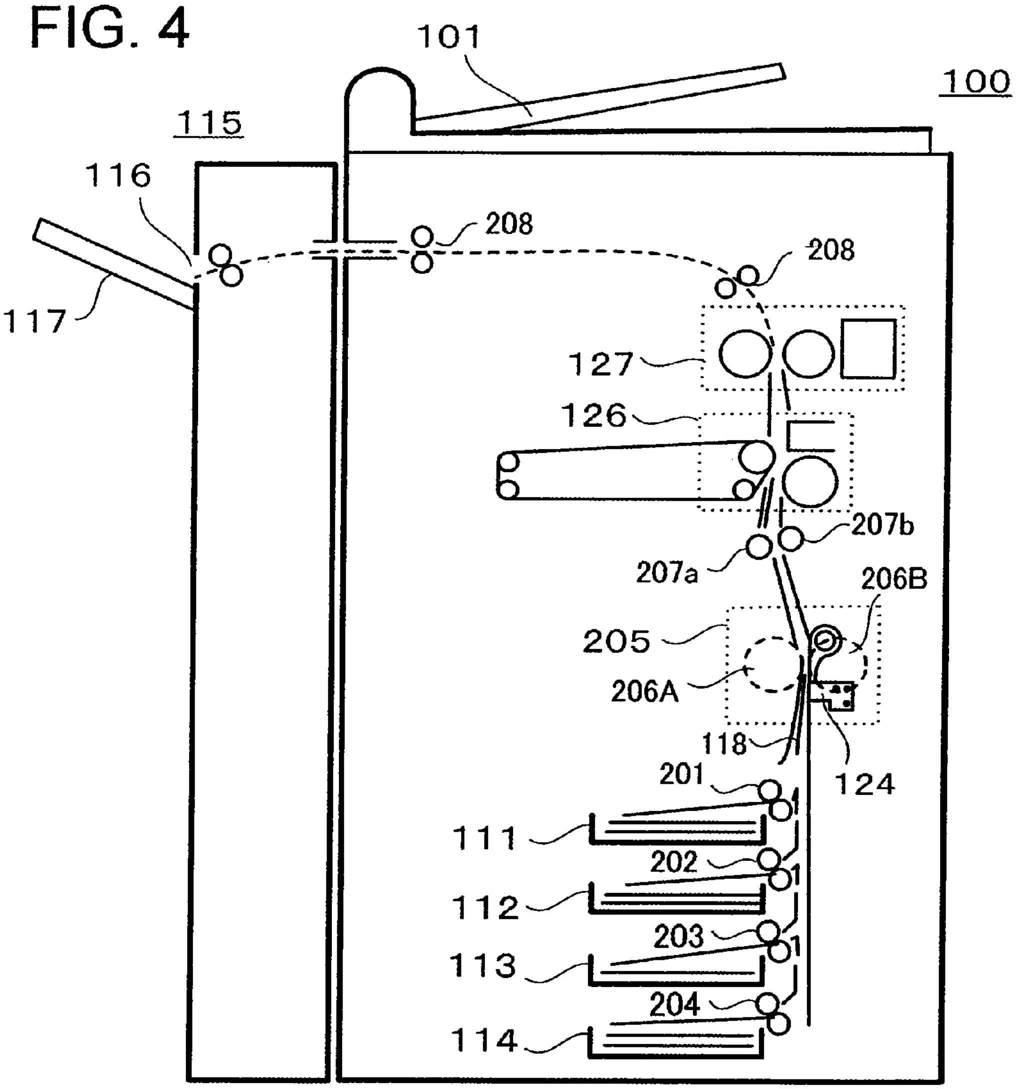
FIG. 4 is a diagram showing the schematic structure in which a process of supply of a sheet, printing on the sheet, and discharge of the sheet in the MFP according to the embodiment is drawn.

A schematic structure of the MFP according to this embodiment in which a flow of a sheet is mainly drawn is shown in FIG. 4.

The plain paper 1, the plain paper 2, the thick paper 1, and the thick paper 2 are stored in the paper feeding cassettes 111, 112, 113, and 114. The sheets stored in the paper feeding cassettes are selectively extracted one by one by paper feeding rollers 201, 202, 203, and 204 as required and fed to a paper-thickness detecting and conveying unit 205. A circuit that drives the paper feeding rollers 201, 202, 203, and 204 is also included in the sheet-supply control unit 123 shown in FIG. 3.

The paper-thickness detecting and conveying unit 205 includes, as described later, the paper-thickness detecting unit 124 that detects the thickness of the conveyed sheet 118, two pairs of conveying rollers for conveying the sheet, i.e., two conveying driving rollers 206A and two conveying driven rollers 206B. The sheet, the thickness of which is detected by the paper-thickness detecting unit 124 of the paper-thickness detecting and conveying unit 205, is conveyed and aligned by a pair of registration rollers 207*a* and 207*b*. The sheet aligned by the registration rollers 207*a* and 207*b* is supplied to the developing and transfer unit 126. The electrostatic latent image generated by the latent-image generating unit 125 shown in FIG. 2 is developed by the developing and transfer unit 126 with a toner and transferred onto the conveyed sheet.

The sheet having the toner image transferred thereon is subjected to image fixing processing, i.e., printing by the fixing unit 127. The printed sheet is discharged from the apparatus main body 100 through several pairs of conveying rollers 208 and enters the post-processing apparatus 115. The sheet that enters the post-processing apparatus 115 is subjected to various kinds of post processing such as stapling (not shown) in the post-processing apparatus 115, discharged from the sheet discharge port 116, and stacked on the stacking tray 117.

Figure 5:
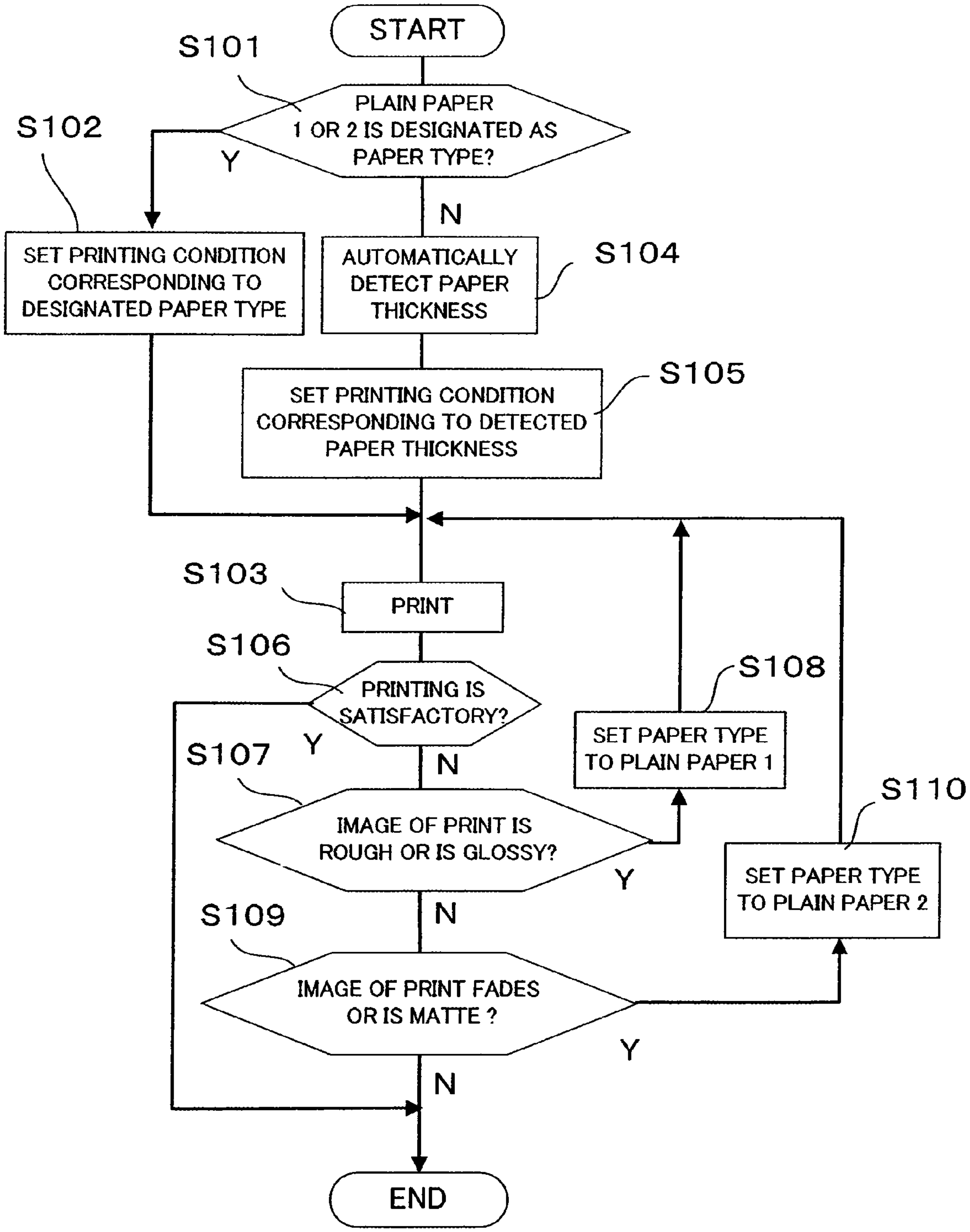
FIG. 5 is a flowchart for explaining operations of the MFP according to the embodiment.

A flowchart of operations in selecting plain paper in this embodiment is shown in FIG. 5. In Act S101 in FIG. 5, the apparatus detects whether the plain paper 1 (P1) or the plain paper 2 (P2) is selected on a screen of the touch panel display 103 shown in FIG. 2. When a user touches an icon to select the plain paper 1 or 2, in Act S102, the apparatus sets a printing condition corresponding to the plain paper and, in Act S103, performs printing.

On the other hand, in Act S101, when the user is not sure which of the plain paper 1 and the plain paper 2 a sheet corresponds to, the user clicks the icon P0 of the plain paper (automatic).

Then, in Act S104, this apparatus measures the thickness of the sheet using the paper-thickness detecting and conveying unit 205. The measurement of the thickness of the sheet by the paper-thickness detecting and conveying unit 205 is described in detail later.

In the next Act S105, the apparatus estimates basis weight according to the detected paper thickness and automatically sets a printing condition (fixing temperature in the fixing unit) corresponding to the basis weight. Thereafter, the apparatus performs printing in Act S103 under the printing condition automatically set.

After performing the printing in Act S103, in the next Act S106, the user determines, looking at a printed image, whether satisfactory printing is performed. If the printed image is satisfactory, the printing is finished.

On the other hand, when the satisfactory printed image is not obtained, in the next Act S107, the user determines whether the printed image is rough or is glossy. When such a phenomenon occurs in the printed image, in Act S108, the user sets a paper type to the plain paper 1. Thereafter, in Act S103, the apparatus performs printing again.

When the phenomenon does not occur in Act S107, in Act S109, the user determines whether the printed image fades or is matte. When such a phenomenon occurs, the user shifts to Act S110 and sets a printing condition for the plain paper 2 shown in FIG. 2. The apparatus returns to Act S103 and performs printing again.

After the developing and transfer unit 126 transfers a toner image onto a sheet, the fixing processing unit 127*a* of the fixing unit 127 performs fixing processing for the toner image. The fixing-voltage control unit 127*b* controls temperature for the fixing processing. The icon P1 of the plain paper 1 and the icon P2 of the plain paper 2 are associated with the fixing-voltage control unit 127*b*.

When the plain paper 1 is selected, the fixing-voltage control unit 127*b* controls fixing temperature as a printing condition to set fixing temperature in the fixing unit 127 within a range of about 150° C. to about 175° C. (first fixing temperature).

On the other hand, when the plain paper 2 is selected, the fixing-voltage control unit 127*b* controls fixing temperature as a printing condition to set fixing temperature in the fixing unit 127 within a range of about 160° C. to about 180° C. (second fixing temperature).

A guidance indicating in what kind of state of a printed image a paper type is set to the plain paper 1 or the plain paper 2 is written in, for example, a manual of this apparatus. The user reads this manual, looks at a state of a printed image, and sets a paper type to the plain paper 1 or the plain paper 2.

Alternatively, the apparatus may display the guidance on the touch panel display 103 and cause the user to select a paper type. The apparatus displays a question "Is printing satisfactory?" on the touch panel display 103 when printing is performed, causes the user to display an answer "Yes" or "No" below the question, and displays an indication (a) "a printed image is rough or is glossy" and an indication (b) "a printed image fades or is matte" below "Yes". When "Yes" is selected, the apparatus finishes the printing.

When "No" is selected, the apparatus allows the user to select the two indications (a) and (b). When (a) is selected, the apparatus automatically sets a printing condition for the plain paper 1 shown in FIG. 2. On the other hand, when (b) is selected, the apparatus automatically sets a printing condition for the plain paper 2.

In this way, when the apparatus displays the guidance on the touch panel display 103 and causes the user to select a paper type, there is an advantage that the user can easily select the plain paper 1 or the plain paper 2.

Automatic detection of paper thickness by the paper-thickness detecting and conveying unit 205 shown in FIG. 3 in the apparatus according to this embodiment is explained in detail.

Figure 6:
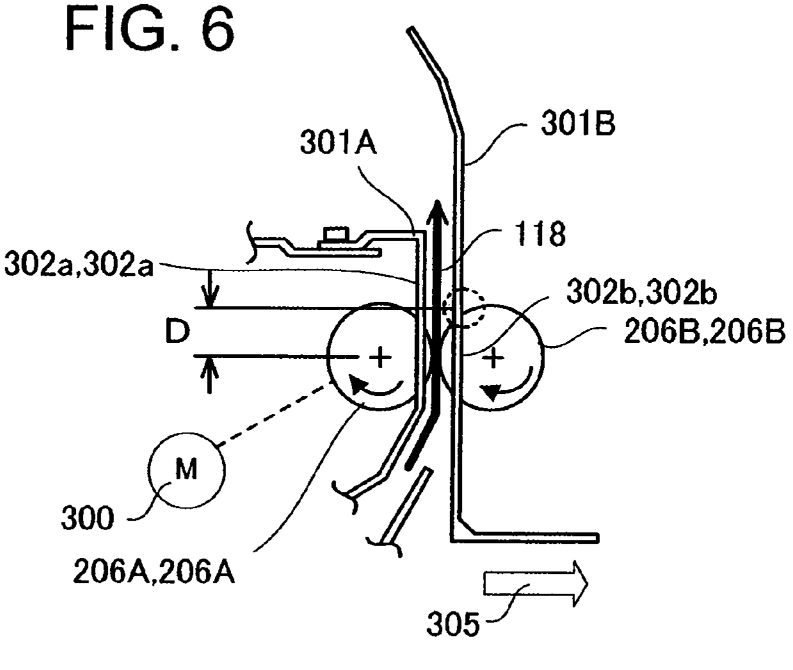
FIG. 6 is a diagram for explaining a relation between a conveying driving mechanism and a paper-thickness detecting mechanism in the embodiment.

The sectional structure of the paper-thickness detecting and conveying unit 205 is shown in FIG. 6. The conveying driving rollers 206A are rollers, at least peripheral surfaces of which are formed of, for example, rubber. The conveying driving rollers 206A are driven to rotate by a conveying driving motor 300. The conveying driven rollers 206B are rollers, peripheral surfaces of which are formed of, for example, plastic. The conveying driven rollers 206B rotate according to the rotation of the conveying driving rollers 206A.

The sheet passes between a conveyance guide 301A and a conveyance guide 301B. Schematically, the conveyance guide 301A is formed in a reverse L shape in section. The conveyance guide 301B is formed in an L shape in section. The sheet 118 is conveyed upward by the conveying driving rollers 206A and the conveying driven rollers 206. The conveyance guide 301B is configured to be movable in a lateral direction, i.e., a direction of an arrow 305 such that, when the sheet 118 jams during the conveyance, the sheet 118 can be easily removed.

Figure 7:
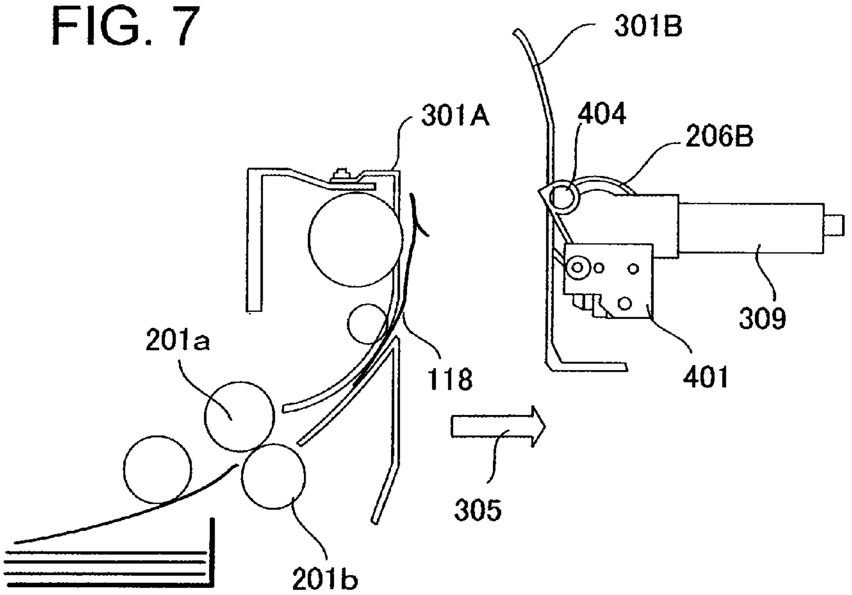
FIG. 7 is a diagram for explaining that it is possible to separate a conveyance guide 301B and the like in the lateral direction from a conveyance guide 301A and the like in the embodiment.

A sectional view in which the conveyance guide 301B and the conveying driven rollers 206B are separated from the conveyance guide 301A and the conveying driving rollers 206A is shown in FIG. 7. A perspective view in a state in which the conveying driven rollers 206B are separated in the lateral direction from the conveyance guide 301B is shown in FIG. 8.

Openings 302*a* are provided in the conveyance guide 301A. Openings 302*b* are provided in the conveyance guide 301B. The conveying driving rollers 206A and the conveying driven rollers 206B are set in contact with each other through the openings 302*a* and the openings 302*b*. When the sheet 118 is fed from the paper feeding cassettes 111 to 114, the sheet 118 is nipped by the conveying driving rollers 206A and the conveying driven rollers 106B and conveyed in an arrow direction (upward). As described later, the thickness of the sheet is detected by the paper-thickness detection unit 124 during the conveyance.

Figure 8:
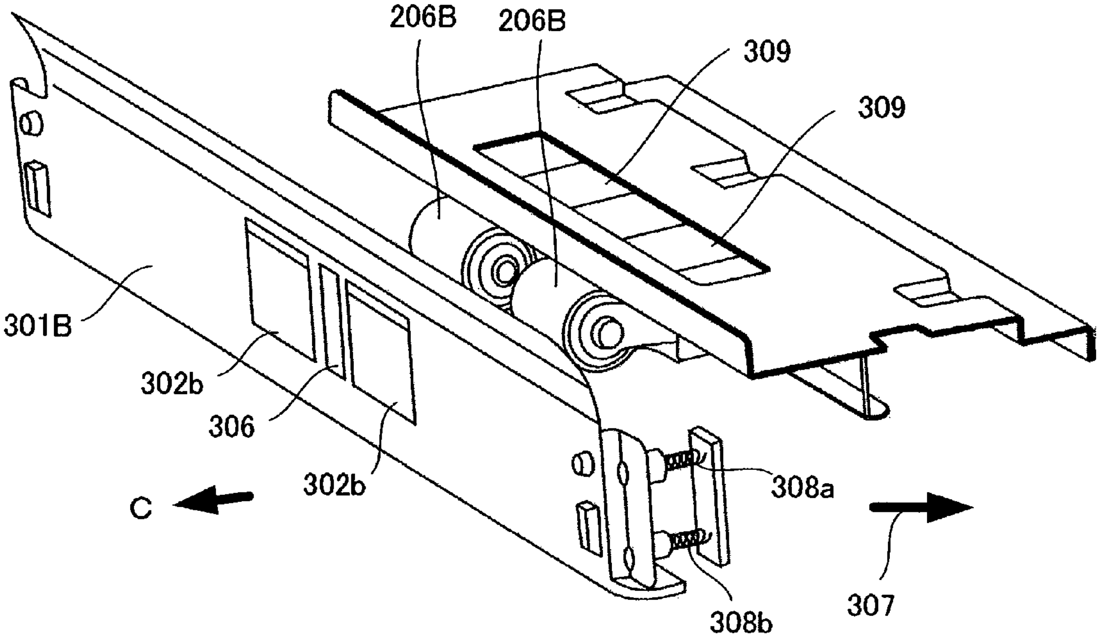
FIG. 8 is a diagram for explaining that it is possible to further separate a conveying driven roller and the like from the conveyance guide 301B in the embodiment.

An opening 306 provided between the two openings 302*b* of the conveyance guide 301B shown in FIG. 8 is an opening for bringing a bearing 404 (not shown in FIG. 7) of the paper-thickness detecting unit 124 described later into contact with the sheet 118.

As shown in FIG. 7, the conveyance guide 301B and the conveyance driven rollers 206B can be separated from the conveyance guide 301A and the conveying driving rollers 206A. For example, when the sheet 118 jams near somewhere between the conveying driving rollers 206A and the conveying driven rollers 206B, it is possible to separate the conveyance guides 301A and 301B as described above and remove the sheet.

As shown in FIG. 8, the conveyance guide 301B is attached to the main body and pressed in an arrow C direction by, for example, pressing springs 308*a* and 308*b*. On the other hand, the conveying driven rollers 206B and a holding mechanism 309 therefor are provided independently from the conveyance guide 301B and the like. This is for the purpose of preventing, as much as possible, vibration or the like of the main body described later from being transmitted to the bearing 404 of the paper-thickness detecting unit 124 and affecting paper thickness detection.

Figure 9:
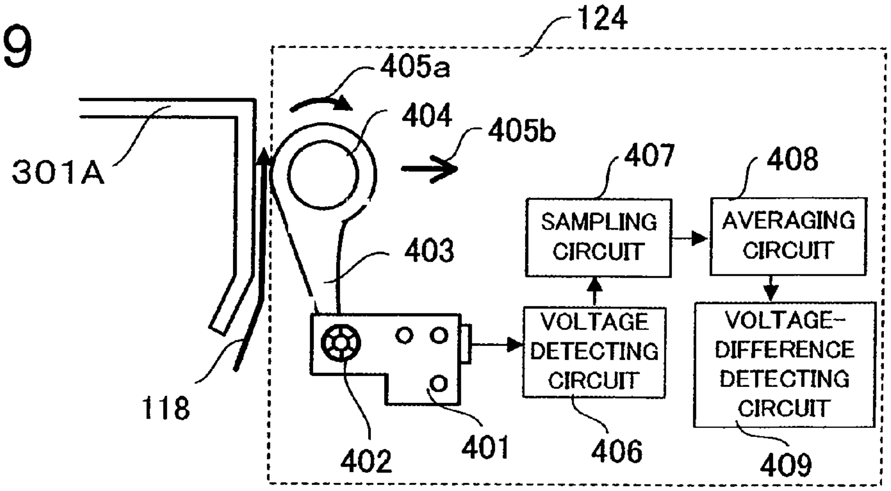
FIG. 9 is a diagram showing a configuration of a paper-thickness detecting unit 124 according to the embodiment.
Figure 10:
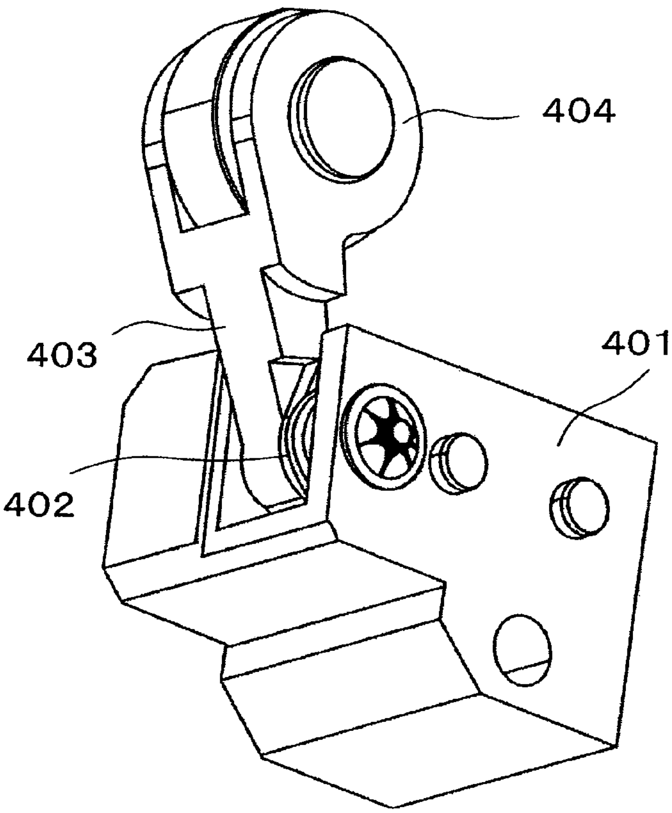
FIG. 10 is a perspective view showing the structure of a resistance-change detecting module 401, an arm 403, and a bearing 404 in the paper-thickness detecting unit 124.

An overall configuration of the paper-thickness detecting unit 124 is shown in FIG. 9. The paper-thickness detecting unit 124 includes a resistance-change detecting module 401, an arm 403 that pivots around a fulcrum 402 of the resistance-change detecting module 401, the bearing 404 provided at a distal end of the arm 403, and the like. FIG. 10 is a perspective view showing the structure of the resistance-change detecting module 401, the arm 403, and the bearing 404.

The bearing 404 is pressed in a direction of the conveyance guide 301A and the conveying driving rollers 206A with predetermined pressure by a not-shown spring or the like. A pressing load P of the spring is, for example, 100 g. As shown in FIG. 6, a contact position of the sheet 118 and the bearing 404 is provided on a downstream side of a nip point of the conveying driving rollers 206A and the conveying driven rollers 206B. A distance D between the nip point of the conveying driving rollers 206A and the conveying driven rollers 206B and the contact position of the sheet 118 and the bearing 404 is, for example, about 6 mm.

If the pressing load P is too large, when the sheet 118 enters between the conveyance guide 301A and the conveyance guide 301B, the sheet 118 buckles without being smoothly conveyed. When the pressing load P is too small, the bearing 404 is not properly brought into contact with the sheet 118. The bearing 404 tends to be separated from the sheet 118 by the vibration of the driving system. The bearing 404 also separates from the sheet 118 because of the shock of the entrance of the sheet 118. Therefore, it is difficult to measure accurate thickness of the sheet 118 if the pressing load P is too low.

When the distance D is too large, a position where the bearing 404 comes into contact with the sheet 118 is away from a position where the sheet 118 is driven to be conveyed, i.e., a contact position of the conveying driving rollers 206A and the conveying driven rollers 206B. Since the bearing 404 does not have a function of conveying the sheet 118, even in such a situation, sheet conveying force is small in the position where the bearing 404 comes into contact with the sheet 118. As a result, normal conveyance of the sheet 118 tends to be difficult. In this way, in general, the sheet conveying force by the conveying driving rollers 206A and the conveying driven rollers 206B, the pressing load P of the bearing 404, and the distance D are related.

Therefore, although the pressing load P of the bearing 404 is different depending on a material, the structure, and the like of the bearing 404, the sheet conveying force, and the like, usually, the pressing load P only has to be about 60 g to 140 g and is preferably about 80 g to 120 g. Although the distance D is different depending on the length of a contact section of the conveying driving rollers 206A and the conveying driven roller 206B, the conveying force, and the like, usually, the distance D only has to be about 0 mm to 10 mm and is preferably in a range from about 2 mm to 8 mm.

When the sheet 118 is conveyed along the conveyance guide 301A, the bearing 404 rotates in a direction indicated by an arrow 405*a*. The arm 403 shifts, i.e., pivots in a direction indicated by an arrow 405*b* because of the thickness of the sheet 118. A magnet is provided near a fulcrum of the arm 403. A magnetic resistance sensor that uses magnetic resistance, a resistance value of which changes according to a change in a magnetic field, is provided near the magnet.

An electric signal output of the magnetic resistance sensor is inputted to the voltage detecting circuit 406. An output voltage of the voltage detecting circuit 406 is sampled, for example, ten times by the sampling circuit 407. The output voltage is sampled and sampled values are averaged because, when the bearing 404 is moved in a direction indicated by an arrow 405*b* by the vibration of the apparatus or the conveyance of the sheet 118, a value of the magnetic resistance changes and the output voltage of the voltage detecting circuit 406 changes.

Voltage values sampled by the sampling circuit 407 are averaged by the averaging circuit 408 and inputted to the voltage-difference detecting circuit 409. The voltage-difference detecting circuit 409 detects a difference in the averaged voltage value. This voltage difference corresponds to the thickness of the sheet 118. The magnetic resistance of the magnetic resistance sensor acts in a direction in which the resistance value decreases when the sheet 118 is conveyed to the paper-thickness detecting unit 124. The output voltage value of the voltage detecting circuit 406 decreases.

A voltage value detected by the voltage detecting circuit 406 is set to 1 mV with respect to the thickness 1 μm of the sheet 118. Usually, since the thickness of plain paper is about 100 μm, the output voltage is detected as about 100 mV for the plain paper. For example, if the voltage V0 before sheet passage is 3.3 V and the thickness of paper is large around about 1.35 V, the voltage value changes in a decreasing direction.

Figure 11:
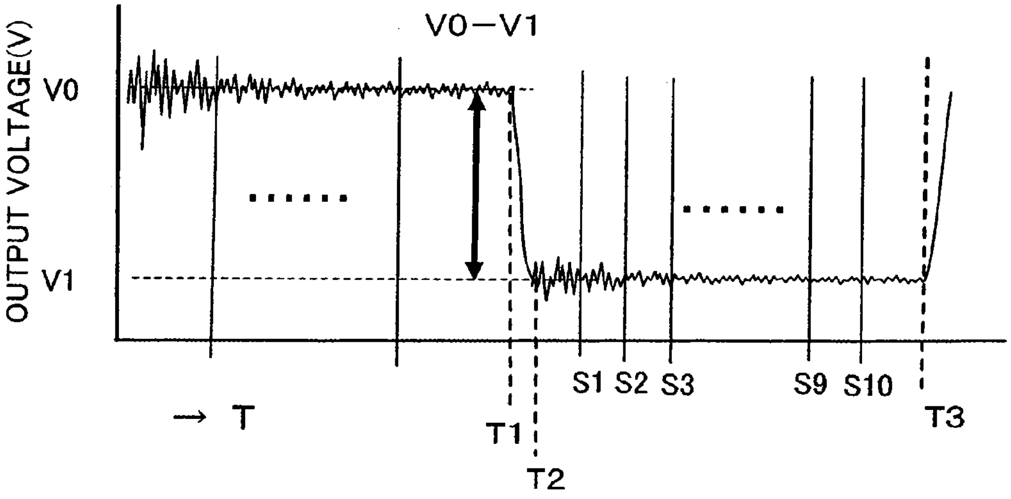
FIG. 11 is a diagram showing an example of output voltage of a voltage detecting circuit 406 at the time when a sheet is fed into the paper-thickness detecting unit 124.

For example, when it is assumed that the sheet 118 is nipped by the bearing 404 from time T1 to T2 and the sheet 118 is conveyed and returns to an original state at time T3, as shown in FIG. 11, the voltage detecting circuit 406 outputs a voltage of about V0 when the sheet 118 is not present. Even in this state, an output value fluctuates because of the vibration of the apparatus and the like. Fluctuating output voltage values are sampled by the sampling circuit 407 and the sampling values are averaged by the averaging circuit 408. The averaged voltage value is sent to the voltage-difference detecting circuit 409. V0 is once stored as a voltage value at the time when the sheet 118 is not conveyed to the paper-thickness detecting unit 124.

At time T1, the sheet 118 is conveyed to the paper-thickness detecting unit 124, the sheet 118 is nipped by the bearing 404 and the conveyance guide 301A, and the bearing 404 rotates as indicated by an arrow 405*a* and pivots as indicated by an arrow 405*b*. At this point, a value of the magnetic resistance in the magnetic resistance sensor decreases. After time T2, the output value of the voltage detecting circuit 406 falls below V0 as shown in FIG. 9.

Even in a state in which the sheet 118 is nipped by the bearing 404 and the conveyance guide 301A and moves, the bearing 404 is moved by the movement of the sheet 118 and the vibration of the apparatus. According to the movement of the bearing 404, the output voltage value of the voltage detecting circuit 406 fluctuates. The fluctuating voltage values are sampled, for example, ten times by the sampling circuit 407 and averaged by the averaging circuit 408. An average value of the voltage values is inputted to the voltage-difference detecting circuit 409 as a voltage value V1 in a state in which the sheet 118 is inserted.

The voltage-difference detecting circuit 409 outputs, as a voltage difference, a value obtained by subtracting the voltage value V1 from the voltage value V0 detected earlier. This value (V0−V1) corresponds to the thickness of the sheet 118. The thickness of the sheet 118 is detected. In this way, if paper thickness is detected as a difference of voltage values rather than a voltage value, it is possible to cancel an offset of voltages. A problem such as a change in a voltage value due to distortion by a conveyance guide is eliminated. Therefore, there is an advantage that paper thickness can be more accurately measured.

In the explanation of the embodiments, the present invention is applied to the multifunction color copying apparatus. However, the present invention can be applied not only to the multifunction color copying apparatus but also to other image forming apparatuses that have image generating units, which generate images printed on recording sheets, and designate a type of paper to be printed such as a normal copying machine, a printer, and a facsimile.

In the embodiments of the present invention, fixing temperature is changed according to whether a printed image is rough or is glossy or whether an image fades or is matte. However, in the present invention, directing attention only to the gloss of the printed image, fixing temperature may be changed according to whether the gloss is large or small.

In the embodiments of the present invention, paper thickness is detected by the paper-thickness detecting unit having the specific configuration to estimate a paper type and perform printing. However, paper thickness may be detected by other apparatuses to estimate a paper type and perform printing.

Moreover, the present invention may be adapted not to detect paper thickness but to directly detect a paper type and perform printing under a printing condition corresponding to the paper type. In short, if a paper-type detecting unit that can estimate a paper type and directly detect a paper type is provided, the object of the present invention can be attained.

In the explanation in the embodiments of the present invention, after a toner image is obtained, the toner image is transferred onto a sheet. However, the present invention can be applied when the toner image is not transferred but is formed on the sheet.

In the explanation in the embodiments of the present invention, fixing temperature in performing fixing of a transferred image is changed as a printing condition. However, the present invention can be applied when a printing condition other than the fixing temperature is changed.

In the present invention, usually, a paper type is automatically detected according to paper thickness. However, when it is desired to further improve a printed image, it is possible to reset a printing condition according to a state of the printed image and obtain a more satisfactory image.

Obviously, many modifications and variations of the present invention are possible in light of the above teachings. It is therefore to be understood that, within the scope of the appended claims, the present invention may be practiced otherwise than as specification.

What is claimed is:

1. An image forming apparatus, comprising:

an accepting unit that accepts instructions relating to a print including a designation of a paper type of a sheet to be printed;

a detecting unit that detects a paper type of a sheet to be printed;

a setting unit that sets a printing condition corresponding to the paper type accepted by the accepting unit if the accepting unit accepts the designation of the paper type, and sets the paper type detected by the detecting unit if the accepting unit does not accept the designation of the paper type;

a printing unit that prints the sheet based on the printing condition set by the setting unit;

a display unit that displays a guidance asking whether the printing is ended after the printing and asking a selection of the paper type on the basis of an unsatisfactory printed result if the printing is not ended; and a controlling unit that sets the printing condition of the setting unit based on the selection of the paper type on the display unit.

2. The image forming apparatus of claim 1, wherein the printing unit includes a fixing unit that fixes a toner image on the sheet and a fixing-temperature changing unit that changes a fixing temperature of the fixing unit.

3. The image forming apparatus of claim 2, wherein setting the printing condition based on the selection of the paper type on the display unit includes changing the fixing temperature of the fixing-temperature changing unit.

4. The image forming apparatus of claim 3, wherein the detecting unit is a paper-thickness detecting unit that detects a thickness of the sheet.

5. The image forming apparatus of claim 4, wherein the unsatisfactory printed result is that an image to be printed is faded, rough, or glossy.

6. The image forming apparatus of claim 5, wherein the sheet is a plain paper.

7. The image forming apparatus of claim 3, wherein a range of a first fixing temperature and a range of a second fixing temperature partially overlap.

8. The image forming apparatus of claim 7, wherein the first fixing temperature is in a range of about 150° C. to about 175° C. and the second fixing temperature is in a range of about 160° C. to about 180° C.

* * * * *